(12) United States Patent
Tobin

(10) Patent No.: US 12,046,891 B2
(45) Date of Patent: Jul. 23, 2024

(54) OPTIMIZED TRANSFORMER PROTECTION

(71) Applicant: S&C Electric Company, Chicago, IL (US)

(72) Inventor: Thomas J. Tobin, Northbrook, IL (US)

(73) Assignee: S&C Electric Company, Chicago, IL (US)

( * ) Notice: Subject to any disclaimer, the term of this patent is extended or adjusted under 35 U.S.C. 154(b) by 263 days.

(21) Appl. No.: 17/876,677

(22) Filed: Jul. 29, 2022

(65) Prior Publication Data

US 2023/0111809 A1     Apr. 13, 2023

Related U.S. Application Data

(60) Provisional application No. 63/253,350, filed on Oct. 7, 2021.

(51) Int. Cl.
| | | |
|---|---|---|
| *H02H 3/00* | (2006.01) | |
| *H02H 1/04* | (2006.01) | |
| *H02H 3/08* | (2006.01) | |
| *H02H 3/093* | (2006.01) | |
| *H02H 7/04* | (2006.01) | |

(52) U.S. Cl.
CPC ............ *H02H 3/093* (2013.01); *H02H 3/006* (2013.01); *H02H 1/04* (2013.01); *H02H 3/00* (2013.01); *H02H 3/08* (2013.01); *H02H 7/04* (2013.01)

(58) Field of Classification Search
CPC ............... H02H 3/00; H02H 3/08; H02H 7/04
See application file for complete search history.

(56) References Cited

U.S. PATENT DOCUMENTS

| | | | |
|---|---|---|---|
| 5,274,349 | A | 12/1993 | Hassler et al. |
| 5,303,112 | A | 4/1994 | Zulaski et al. |
| 2009/0091867 | A1 | 4/2009 | Guzman-Casillas et al. |
| 2009/0290275 | A1* | 11/2009 | Staszesky ............... H02H 7/30 361/63 |
| 2011/0031220 | A1 | 2/2011 | Nilsson et al. |
| 2011/0125339 | A1 | 5/2011 | Bright |
| 2018/0358805 | A1 | 12/2018 | Staszesky et al. |
| 2019/0372330 | A1* | 12/2019 | Alizadeh ............... H02H 3/006 |
| 2020/0244059 | A1 | 7/2020 | Lellis Junior et al. |
| 2020/0251895 | A1* | 8/2020 | Tobin ..................... H02H 1/04 |

OTHER PUBLICATIONS

International Search Report and Written Opinion for International Application No. PCT/US2022/38755 dated Mar. 22, 2023. (13 pages).

* cited by examiner

*Primary Examiner* — Gary A Nash

(57) ABSTRACT

A method for determining an optimized TCC operating curve for an electronic interrupting device that protects a distribution transformer in a power distribution network, where the TCC operating curve is some optimized predetermined percentage above a TCC curve for normal transformer operation. The method includes providing a TCC transformer curve that identifies an allowed transformer operation current once the transformer magnetics have been stabilized and the transformer is operating normally, and determining a TCC operating curve that is defined by points along the transformer curve plus a predetermined percentage above the transformer curve, where the operating curve identifies a response time for when the electronic interrupting device will open in response to a certain current flow.

20 Claims, 3 Drawing Sheets

OPTIMIZED TRANSFORMER PROTECTION

CROSS-REFERENCE TO RELATED APPLICATION

This application claims the benefit of priority from the U.S. Provisional Application No. 63/253,350, filed on Oct. 7, 2021, the disclosure of which is hereby expressly incorporated herein by reference for all purposes.

BACKGROUND

Field

This disclosure relates generally to a method for determining an optimized time-current characteristic (TCC) operating curve for an electronic interrupting device and, more particularly, to a method for determining an optimized TCC operating curve for an electronic interrupting device that protects a distribution transformer.

Discussion of the Related Art

An electrical power distribution network, often referred to as an electrical grid, typically includes a number of power generation plants each having a number of power generators, such as gas turbines, nuclear reactors, coal-fired generators, hydro-electric dams, etc. The power plants provide power at a variety of medium voltages that are then stepped up by transformers to a high voltage AC signal to be connected to high voltage transmission lines that deliver electrical power to a number of substations typically located within a community, where the voltage is stepped down to a medium voltage for distribution. The substations provide the medium voltage power to a number of three-phase feeders including three single-phase feeders that carry the same current, but are 120° apart in phase. A number of three-phase and single phase lateral lines are tapped off of the feeder that provide the medium voltage to various distribution transformers, where the voltage is stepped down to a low voltage and is provided to a number of loads, such as homes, businesses, etc. Power distribution networks of the type referred to above typically include a number of switching devices, breakers, reclosers, interrupters, etc. that control the flow of power throughout the network and respond to abnormalities in the power flow.

Periodically, faults occur in the distribution network because of various things, such as animals touching the lines, lightning strikes, tree branches falling on the lines, vehicle collisions with utility poles, etc. Faults may create a short-circuit, which may cause the current flow from the source to significantly increase, for example, many times above the normal current, along the fault path. This amount of current causes the electrical lines to significantly heat up and possibly melt, and also could cause mechanical damage to various components in the network.

Primary side protective devices are employed to protect pole-type transformers from faults and other high currents, where the objective of protecting a transformer is to remove any fault as quickly as possible. A transformer has an assigned rated power and associated rated full-load current, where protection is referenced to the full load current as one (1) per unit (PU). These small, overhead distribution transformers are often overloaded because of their capability and the economic acceptance of partial loss-of-life. The protective device is usually sized to allow two times the rated full load current of the transformer to flow without responding.

These protective devices are subject to energizing inrush transient currents and cold-load currents, which should be considered so that the protection is not activated during these events. Typical inrush current magnitudes for distribution transformers are twelve times the full load current at the 0.1 second point and 25 times the full load current at the 0.01 second point. Cold-load inrush currents that are above the rated full load current for many seconds must be carried by the protective device after an outage. Typical cold-load inrush currents are two times the full load current at 100-300 seconds, three times the full load current at 10 seconds, and six times full load at one second. Some utilities may experience twice the full load current for 30 minutes and three times the full load current for 30 seconds when resistive load predominates. The inrush points and cold-load pickup points form a TCC curve that must fall below and to the left of the protective device's minimum TCC curve.

The currents experienced by transformer protective devices fall into three ranges. If load currents are less than the intended overload current of two (2) PU the protective device should not operate for these currents. Transformer-limited fault currents are limited partially or in whole by the transformer impedance and internal to the transformer or associated with faults on the transformer's secondary wiring. These range from the intended overload current of two (2) PU up to the (bolted) secondary terminal fault limited by the transformer through-fault impedance. For a transformer with a 2% (typical of small overhead transformers), the maximum transformer-limited fault current is 50 PU, and the protective device should respond as quickly as possible while avoiding transformer magnetizing inrush and load inrush currents. Primary fault currents that are internal or external to the transformer and limited by the available fault current from the supply power system should be above the maximum transformer-limited fault current and up to the maximum system fault current within the device's interrupting rating.

When the transformer secondary voltage is lower than 480 V, the probability of a fault current up to the maximum transformer-limited fault current is low. The transformer-limited range can be considered to be 50% to 70% of the bolted secondary fault current limited by only the transformer impedance. This allows a faster protection response to any of these higher currents without the risk of a false device operation. The time-current response of protective devices are generally graphical logarithmic scaled plots. For a 7.2 kV, 50 kVA single-phase transformer, the full load current (1 PU) is approximately 6.9 A and the 2 PU intended overload current is 13.8 A. The transformer limited fault current range is from the 2 PU (13.8) A up to 25 PU (173 A), reflecting the low probability of a bolted secondary fault at the transformer terminals. The primary fault current range is up to 6300 A.

Fuses, which utilize a meltable element that responds to the thermal heating from the passage of a fault current, are the most common protective device for small transformers. It is common practice to select the smallest fuse size that matches the intended overload current. For the example transformer rated 7.2 kV and 50 kVA, a typical fuse with high lightning surge capability used for transformer protection is the KSR speed fuse link. Fuses must be applied with continuous currents that are a fraction of the minimum melting current. The KSR fuse will carry 15 A, but only respond to currents 30 A (4.3 PU) or higher. The fuse does pass the desired intended overload current (2 PU or 13.9 A) but does not offer any protection at current just above this level. The fuse link will pass the magnetizing and cold-load inrush currents by responding more slowly than the inrush current.

Transformer standards dictate a withstand capability for faults on the secondary terminals or wiring. This is shown as a through-fault withstand curve. It is common practice to provide primary protection that is faster than the transformer withstand curve. The 15 KSR fuse responds to faults under the withstand curve, but only for currents above 50 A (7.2 PU). At approximately 50% of the bolted secondary fault current (175 A or 25 PU), the fuse responds very slowly in two (2) seconds. For higher fault currents in the primary fault range, the fuse responds on its inverse time characteristic, eventually responding in 0.01 seconds (about 1 power-frequency cycle) at 2000 A. For currents between 175 A and 2000 A, the response is slower than desired.

It has become increasingly popular to replace the traditional fuse with an electronic fault interrupting or reclosing device at the location where a distribution lateral line is tapped off of a main three phase feeder or where a distribution transformer is connected to either a main or a lateral line. These devices reduce the number of service calls to replace fuses in response to temporary faults that can be cleared by the fault interrupting device. One of those devices used for this purpose is known as the VacuFuse™ transformer protector, available from S&C Electric Company, Chicago, Illinois, USA.

These modern electronic transformer protection devices, such as a vacuum interrupter with electronic sensing and control, can provide significantly better protection than fuses. They can protect faster over a wider range of fault currents. They can carry load current up to their minimum response current eliminating the gap typical of fuse protection. They can be tailored to ignore transformer magnetizing inrush currents allowing much faster protection for fault currents of similar magnitudes. The elimination of the magnetizing inrush response allows the protection to be sized to pass the known load inrush currents, including the cold-load inrush current, which loads the transformer two (2) PU. The response for faults with similar magnitudes as the load current inrush can be accelerated, and 1 cycle protection response can be achieved for currents starting at 50% of the bolted secondary fault current level.

SUMMARY

The following discussion discloses and describes a method for determining an optimized TCC operating curve for an electronic interrupting device that protects a distribution transformer in a power distribution network, where the TCC operating curve is some optimized predetermined percentage above a TCC curve for normal transformer operation. The method includes providing a TCC transformer curve that identifies an allowed transformer operation current once the transformer magnetics have been stabilized and the transformer is operating normally, and determining a TCC operating curve that is defined by points along the transformer curve plus a predetermined percentage above the transformer curve, where the operating curve identifies a response time for when the electronic interrupting device will open in response to a certain current flow.

The following discussion also discloses and describes a method for determining when an electronic interrupting device will open in response to detecting overcurrent, where the electronic interrupting device protects an object transformer in a power distribution network. The method includes identifying a plurality of group transformers each having a different power rating and current rating, where the object transformer is one of the group transformers. The method defines at least two groups of the group transformers where each group includes at least one transformer and where one group includes transformers having a sequence of lower power ratings and one group includes transformers having a sequence of higher power ratings. The method provides a time/current operating curve for the electronic interrupting device that determines when the electronic interrupting device will open in response to a certain current flow over a certain time for each group, where the operating curve for each group is determined based on the transformer having the highest power rating in the group. The method sets the interrupting device with the operating curve that is associated with the group transformer having the highest power rating in the group having the sequence of lower power ratings. The method measures the load current on the object transformer, and changes the operating curve for the interrupting device to the operating curve that is associated with the transformer having the highest power rating in the group having the sequence of higher power ratings if the measured load current is above a predetermined value.

Additional features of the disclosure will become apparent from the following description and appended claims, taken in conjunction with the accompanying drawings.

DETAILED DESCRIPTION

The following discussion of the embodiments of the disclosure directed to a method for determining an optimized time-current characteristic (TCC) operating curve for an electronic interrupting device is merely exemplary in nature, and is in no way intended to limit the disclosure or its applications or uses.

Figure 1:
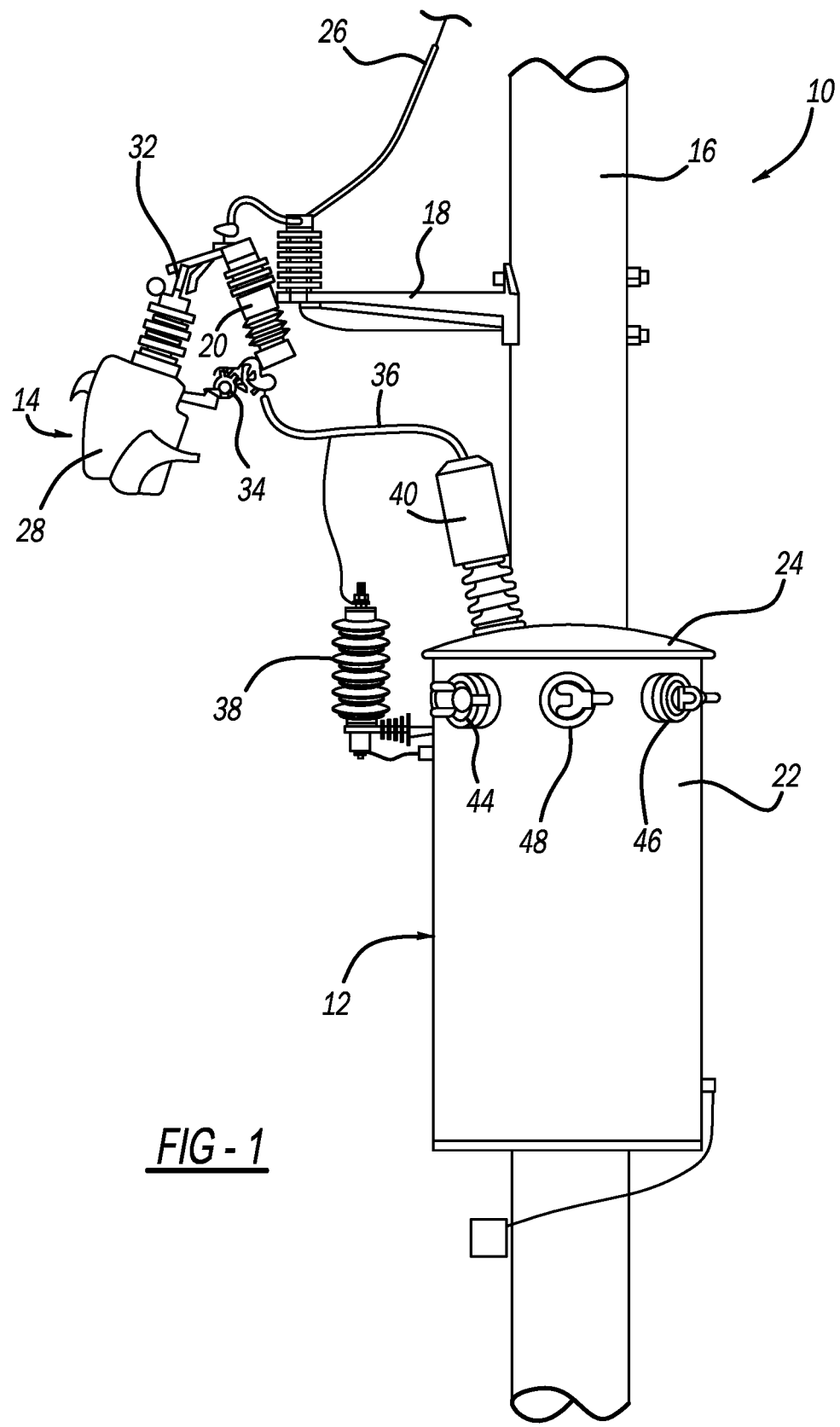
FIG. 1 is an illustration of a pole mounted transformer system including a distribution transformer and an electronic fault interrupting device.

FIG. 1 is an illustration of a pole mounted transformer system 10 including a distribution transformer 12 mounted to a utility pole 16 and a cut-out mounted current or fault interrupting device 14 with reclosing capability mounted to the utility pole 16 by a mount 18 and an insulator 20, where the interrupting device 14 replaces the traditional fuse. The transformer 12 includes an outer tank 22 that is generally cylindrically shaped and has a cover or lid 24 typically filled with an insulating fluid, such as mineral oil, that houses the primary and secondary coils and the transformer core assembly. The transformer 12 will have a certain size and power rating (KVA) based on the amount of load it services, a primary voltage at the terminals of the primary coil during normal operation, a normal full load or base current calculated using nameplate kVA and voltage and a current overload percentage that allows the transformer 12 to operate a certain percentage above its normal load for a certain amount of time. In one non-limiting example merely for representative purposes for the discussion herein, the transformer 12 has a power rating of 50 kVA (kilovolt-ampere), a primary voltage of 7.2 kV, a base current of 3.5 A and an overload percentage of 250%.

The fault interrupting device 14 is intended to represent any electronic reclosing or fault interrupting device of the type discussed above, such as a single phase self-powered magnetically actuated recloser that employs a vacuum interrupter, suitable for performing reclosing operations at a location where a power line 26 is tapped off of a lateral line (not shown). The interrupting device 14 includes an enclosure 28 housing all of the actuators, electronics, components, sensors for measuring and harvesting current, controllers, processors, communications devices, etc. for operating the interrupting device 14 as discussed herein. If the interrupting device 14 performs a reclosing operation and the fault current is still present and repeated current interruption is required, it will be released from a connector 32 and pivot on a hinge 34 to provide a visual indication that is has operated.

The power line 26 at medium voltage that is tapped off of the distribution line is electrically coupled to one terminal of the interrupting device 14 and a power line 36 at medium voltage is electrically coupled to the other terminal of the interrupting device 14 and the primary winding in the transformer 12 through a bushing 40, where the bushing 40 includes an internal conductor and an outer insulation body. A surge arrester 38 is coupled to the line 36 and the tank 22 to provide over-voltage protection from, for example, lightning strikes that may have a duration much less than the response time of the interrupting device 14, but would otherwise cause a traditional fuse to operate. The transformer 12 steps down the medium voltage on the line 36 to a lower voltage, and, in this example, provides 120 volt power at a terminal 44 or 46 and a ground terminal 48 and 240 volt power between the terminals 44 and 46, where the ground terminal 48 is electrically coupled to a neutral line (not shown) in most applications.

Figure 2:
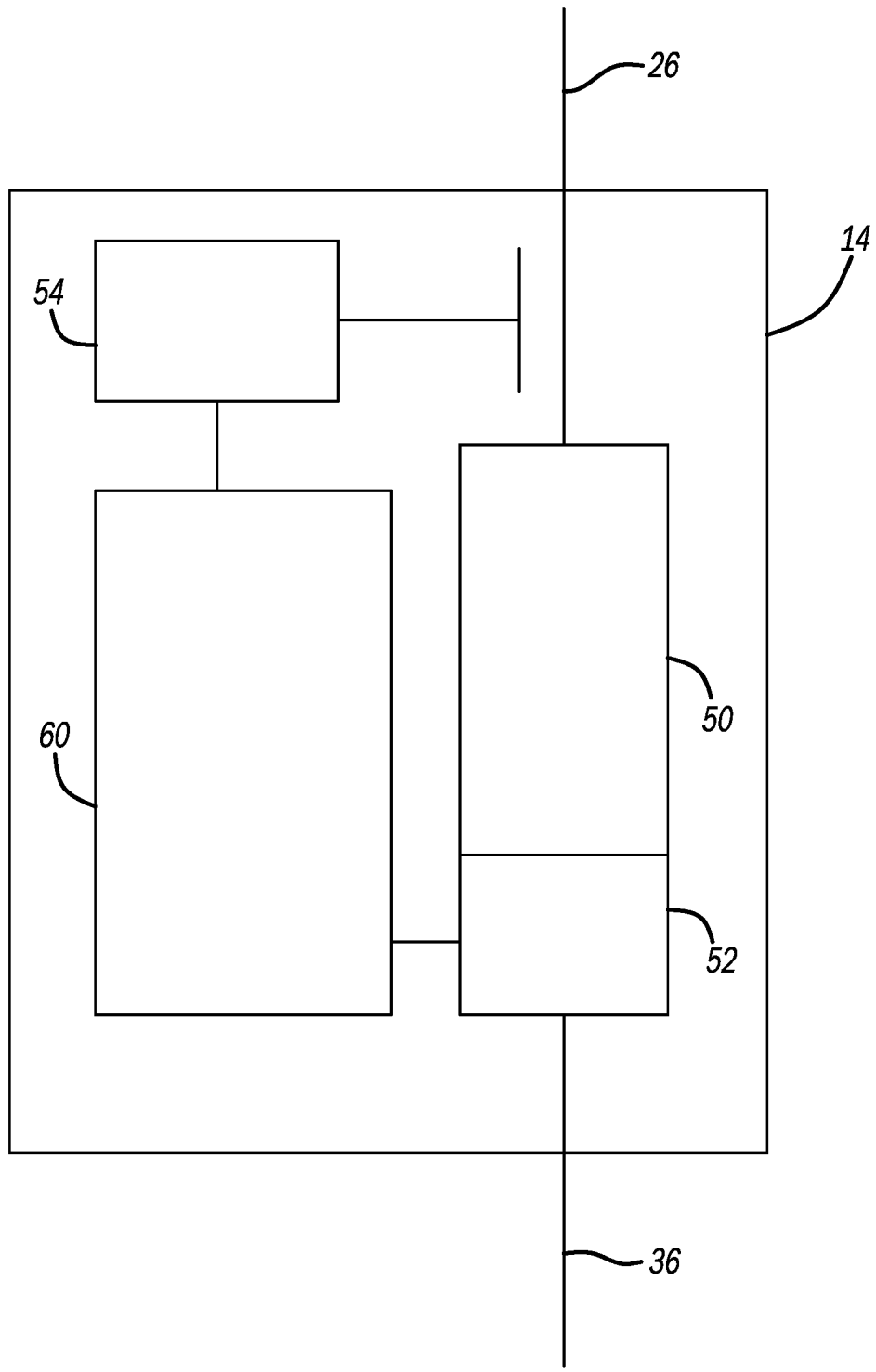
FIG. 2 is a functional block diagram of the fault interrupting device in the system shown in FIG. 1.

FIG. 2 depicts functional aspects of the fault interrupting device 14. The fault interrupting device 14 includes a switch, such as a vacuum interrupter 50, that is actuated by an actuator 52, such as a magnetic actuator. A current sensor 54 is operably disposed in relation to the power line 26 to sense the magnitude of current flow on the power line 26 and to provide a corresponding signal to a controller 60. The current sensor 54 may also be configured to harvest electric power from the power line 26 to power the controller 60 and the actuator 52. The controller 60 is coupled to the current sensor 54 to receive the measurement signals and has an output coupled to the actuator 52 to operate the vacuum interrupter 50 in accordance with a protection strategy. The controller 60 includes (not depicted) an application specific processing device or general purpose processor coupled with a memory containing operating instructions upon which the processor acts to affect operation of the interrupting device 14. In this regard, the processor is operable responsive to receipt of the signal from the current sensor 54 to determine the presence of a fault condition, e.g., current in excess of a threshold value for a predetermined period of time, and to cause operation of the fault interrupting device to interrupt the flow of current into the transformer 12.

The fault interrupting device 14 may be configured to be resettable in an automated manner or responsive to a signal from the controller 60 to close the fault interrupter 14 after one or more interruptions to restore current flow to the transformer 12. This allows the fault interrupting device 14 to restore electric service should the fault be transitory. Under certain conditions, the fault interrupting device 14 may be held open or "locked out" to prevent coupling of current to the transformer 12 until an investigation of the cause of the fault may be determined and rectified, and/or the condition of the transformer assessed.

In accordance with the herein described embodiments, the controller 60 may be provided with at least one and preferably several response curves to which the controller 60 causes operation of the fault interrupting device 14 to interrupt current flow. These electronic controls can be programmed to provide a wide range of protection responses ranging from mimicking a fuse response to a more sophisticated multi-level response. The minimum response characteristic is generally sized to match the transformer, e.g., a 6 A minimum response for a 6 A transformer and a 20 A minimum response for a 20 A transformer.

TCC relationships between time and current for various transformer parameters are provided as industry standards, where operating time is provided relative to current loading. For example, one industry standard provides a relationship between time and current that identifies the top limit of how much current and for how long the transformer can support before its working life is reduced, sometimes referred to as a transformer through-fault-protection (or duration) withstand. These relationships often are shown as a graph with a current scale on the horizontal axis and time on the vertical axis. Those standards can be converted to actual TCC curves for particular transformers, where the current scale is converted to actual amps by multiplying the scale by the transformer's normal base current. For a single phase transformer, the base current is the transformer's power rating divided by the transformer primary voltage. For the example discussed herein for the transformer 12, 50 kVA divided by 7.2 kV is 6.94 A base current.

Figure 3:
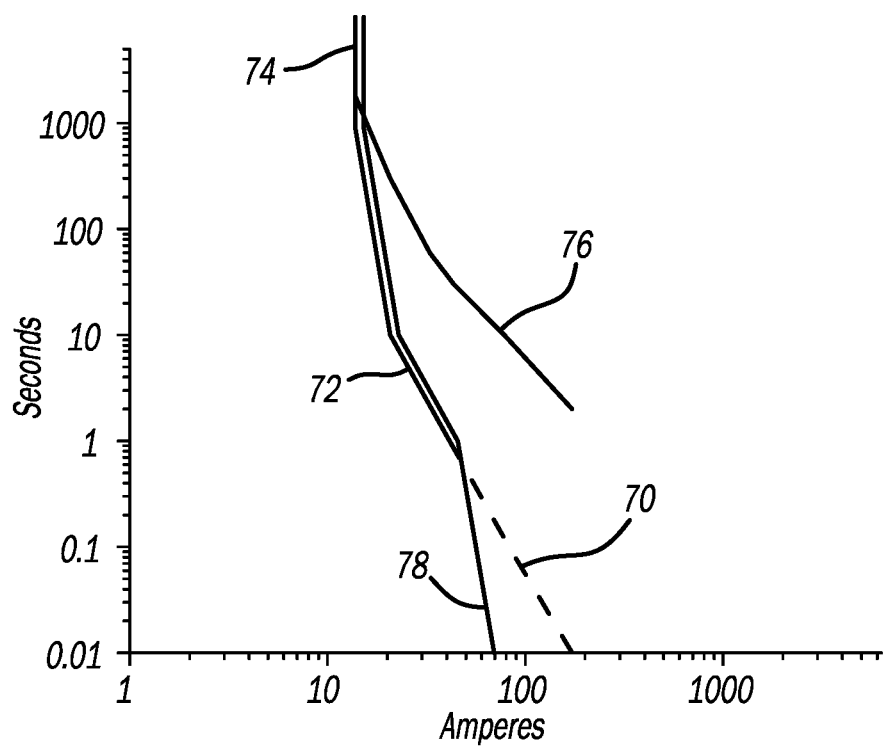
FIG. 3 is a logarithmic graph with current on the horizontal axis and time on the vertical axis showing a transformer through fault protection withstand curve and an optimized fault protection curve for the transformer and the fault interrupting device in the system shown in FIG. 1.

FIG. 3 is a logarithmic graph with current in amps on the horizontal axis and time in seconds on the vertical axis showing various TCC curves as discussed below for the example transformer discussed herein, where the industry standard current scale has been multiplied by 6.94 on the horizontal axis. TCC curve 70 is a transformer current inrush curve that represents normal inrush current for the transformer 12 when it is energized and the transformer magnetics have not yet stabilized. TCC curve 72 is a transformer cold load current inrush curve after the transformer magnetics have stabilized, but normal transformer operation has not yet been reached. TCC curve 74 is the allowed transformer current when the transformer magnetics have been stabilized and the transformer 12 is operating normally at nameplate voltage and kVA. For this discussion, that current is 2 PU, and for the specific example of a 7.2 kV, 50 kVA single-phase transformer, 2 PU is 13.8 A. TCC curve 76 is a transformer through fault protection withstand or damage curve for the transformer 12 of the type referred to above that shows the point above which for a certain current and for a certain amount of time the operating parameters of the transformer 12 are exceeded, which could damage the insulation on the windings, reduce the transformer's life because of excessive wear, cause the transformer 12 to fail, etc. depending on how much current and for how long. The current and time values that are used to obtain the through fault protection withstand curve 76 would have been developed over decades of industry experience and are published in standards.

This disclosure proposes employing an optimized protection TCC curve 78 that is programmed in the controller 60 that is defined at some predetermined small percentage above the curves 72 and 74 to provide quick protection and operation by the fault interrupting device 14 if the curves 72 and 74 are exceeded. In one embodiment, the predetermined percentage is 10%. Specifically, a plurality of sample points are defined along the curves 72 and 74 and the current value for each of those points is multiplied by the percentage value, here 0.10. The current value of each sample point along the curves 72 and 74 are then added to the calculated percentage for that point to provide a corresponding point for the curve 78. The curve 78 is then obtained by a line drawn through those points. The optimization curve 78 falls below the magnetizing inrush curve 70 so as to provide the desired quick protection for the high currents below the curve 70. The fault interrupting device 14 can be prevented from operating during the magnetizing inrush current event by programming the controller 60 to not respond to currents that are at that current level for less than a predetermined period of time, such as one second, when the transformer 12 is first energized.

In one non-limiting embodiment, the minimum response current of the fault interrupting device 14 is 2.2 PU to allow the intended or desired overload current on the transformer 12. The response for current in the transformer-limited fault range can be as follows with interpolated time-current response times in between. At 2.2 PU, the response time of the fault interrupting device 14 is 900 seconds; at 3.3 PU, the response time of the fault interrupter 14 is 10 seconds; at 6.6 PU, the response time of the fault interrupting device 14 is 1 second; and at 10 PU, the response time of the fault interrupting device 14 is 0.01 seconds. For currents above 10 PU, the response time of the fault interrupting device 14 is 0.008 seconds, i.e., ½ power frequency cycle at 60 Hertz. These points mimic the maximum expected cold load current with a 10% increase in the current response.

The protection offered by the optimized protection curve 78 is superior to that conventionally provided by fuses or by electronic devices that try to mimic the fuse response. It provides protection for all currents above the intended overload current. The protection algorithm responds as fast as possible consistent with allowing the transient overload current resulting from a cold load pickup. Transformer-limited faults of 45 A (approximately 6 PU) are removed in 1 second compared to thirty-second protection provided by a fuse. The response for currents above 6 PU is aggressively accelerated to one (1) power-frequency cycle at 10 PU to ensure the fastest removal of these higher currents, which represent faults. This protection response time is 1000 times faster than the fuse response.

Fuses respond to the RMS heating of the current, and it inherently accumulates the heating. This makes fuses sensitive to the high peak asymmetrical currents associated with magnetizing inrush current. The optimized protection response for currents above 6 PU utilizes electronic digital signal processing technology to discern magnetizing inrush currents from overload and fault currents. The current is digitally sampled 8, 16, 32, or more times per power frequency cycle. The fundamental power-frequency current is determined by conventional numerical processing using a discrete Fourier transform (DFT). The magnetizing inrush current's fundamental component is approximately 20% of the RMS current, and this desensitizes the response to the magnetizing inrush current. In addition, the asymmetric magnetizing current has a large second harmonic current that can be extracted by the DFT signal processing. The presence of a large second harmonic current relative to the fundamental current is used to restrain and suppress the protection response since the inrush current is not a fault. For the longer time responses greater than 1 second and up to 900 seconds, fundamental current can be extracted from the DFT using 1 second of sampled data. This reduces the amount of data and processing to evaluate the response, and it provides some averaging of the current over the 1 second time period.

This particular example utilized a 10% shift in current from the cold load characteristic. The shift could also range from 0% to 50%, depending upon the inrush characteristic of the load or the degree of margin desired. Alternative protection shifts the response curve in time ranging from 0% to 200% depending on the inrush characteristic of the load or the degree of margin desired. The response for current higher than 6 PU can be 1 cycle over a range from just above 6 PU up to 25 PU depending on the inrush characteristic of the load or the degree of margin desired or the method used to suppress the magnetizing inrush.

As discussed herein, different transformer sizes require fault interrupting devices having different minimum response times. This adds a significant operational challenge that requires stocking multiple fault interrupting devices and delivering them to the field location while matching them to the correct transformer size. This disclosure also proposes providing a single fault interrupting device that adjusts its protection characteristic, i.e., its TCC protection curve, to cover a range of transformers. The protection starts with the smallest transformer protection response and adapts the protection to a larger transformer size based on detecting the load currents representative of the larger transformer. The use of a single fault interrupting device to cover a range of transformers simplifies deployment and provides a protective response appropriate for the transformer size.

The following is a specific example for overhead, single-phase, 7.2 kV distribution transformers rated 10 kVA to 75 KVA. This can be extended to other groups of transformers at different voltages. Table 1 below lists the transformer sizes and current characteristics for a group of overhead transformers applied on a 7.2/12.47 kV distribution system. The transformers are single-phase connected at 7.2 kV phase to neutral. In North America, the secondary voltages are generally a center-tap-grounded 240 secondary, providing single-phase 120 V line-to-neutral and 240 V line-to-line power.

TABLE 1

Single-phase 7.2 kV Overhead transformers

| Transformer Rating kVA | Rated Current Amperes | Intentional Overload Current Amperes | Protection Group |
|---|---|---|---|
| 10 | 1.5 | 3 | #1 |
| 15 | 2 | 4 | |
| 25 | 3.5 | 7 | |
| 37.5 | 5 | 10.5 | #2 |
| 50 | 7 | 14 | |
| 75 | 10.5 | 21 | |

A fault interrupting device designed to cover this range of protection would have two or more protection response characteristics to match the transformer sizes. For the purpose of describing this embodiment, a fault interrupting device with two protection groups is used. The scheme can be extended to three or more protection groups if desired.

The protection Group #1 setting is sized for the smaller transformers rated 10 kVA to 25 kVA and has a minimum response characteristic of 7 A to allow the intentional transformer overloading up to two times the rating for a 25 kVA transformer. The protection Group #2 setting is sized for the larger transformers rated 37.5 kVA to 75 kVA and has a minimum response characteristic of 21 A to allow intentional transformer overloading up to two times the rating for a 75 kVA transformer.

The electronic controls in the fault interrupting device 14 can be programmed with a variety of protection response times for currents above the minimum response level. For example, the protection Group #1 setting could mimic a 3 A standard speed fuse time-current-characteristic set to respond above 7 A, and the protection Group #2 setting could mimic a 10 A standard speed fuse time-current-characteristic set to respond above 21 A. Faster and more sophisticated response characteristics could be used, and they could enhance the protection provided by the fault interrupting device 14.

The fault interrupting device 14 would be factory configured with the Group #1 setting with a minimum response of 7 A. When the device 14 is first installed, it will monitor the transformer load current of the transformer 12 and shift to the Group #2 setting if the load current exceeds the 7 A minimum response of the Group #1 setting. This adjustment is made depending upon the energization method as follows. For energizations without magnetizing inrush currents, the device 14 can be installed to connect a de-energized transformer with little or no magnetizing inrush current, or it may be installed by the removal of a by-pass jumper on an already energized transformer without any inrush current. Suppose the resulting load current is greater than the 7 A minimum pickup current of the Group #1 setting. In that case, the protection characteristic is automatically shifted to the Group #2 setting since the load current is indicative of the larger transformers.

For energization of the transformer 12 with magnetizing inrush currents, if the installation of the device results in high magnetizing inrush currents, these large currents decay in 1 to 5 seconds. A simple delay of 1 to 5 seconds upon energization before determining the load current will eliminate the inrush current distortion. The load current is determined after an energization delay, and the response characteristic is adjusted to the Group #2 setting if the load current is above 7 A as described above. More sophisticated methods can be used to remove the magnetizing inrush currents and extract the underlying load currents. These methods can include extraction of the fundamental power frequency current without the higher harmonic currents component characteristic of the inrush currents. This can minimize the delay time if desired.

In addition to magnetizing inrush currents that decay rapidly, there may be load inrush currents associated with starting the transformer 12, which could last for several seconds, such as 1 to 5 seconds. These inrush currents can also be eliminated by a simple delay before the load current is determined, and the protection Group setting is shifted. While there may be some loss of diversity, which can temporarily raise the load current, the minimum response characteristic already allows for overloads up to two times the transformer rating ensuring that the shift to the Group #2 setting will only occur when the device 14 is connected to the larger transformers.

Once the initial load current is determined to be above the minimum response current for the Group #1 setting, it is shifted to the Group #2 protection setting and remains there providing the appropriate level of protection for the larger transformers. There is a possibility that a larger transformer might be lightly loaded upon initial energization, and the Group #1 protection setting remains in effect. The device 14 must not falsely respond later when a load current associated with the larger transformers increases above the Group #1 minimum response level. This condition requires a second adaption of the Group protection settings based on the rate of change of load currents. These small, single-phase transformers are limited to supplying 1 to 10 nearby consumers because of secondary voltage constraints. The changes in the transformer primary load current are determined by the largest size individual electric loads. Many electric loads are less than 1 KW and are connected randomly. Larger electric loads can range from 3 to 5 KVA for air conditioning, cooking and drying and to 10 KVA for electric space and water heating. The maximum incremental change in the transformer primary current would be less than approximately 2 A. The fault interrupting device with the Group #1 protection setting would monitor its current for changes over a few seconds. If the current crossed the 7 A minimum response level with a change of less than 3 A to provide some robustness, this would be detected as a load current and not a fault. The device 14 would adapt to the Group #2 protection setting response since the detected load current would represent the larger transformer sizes. If load current crossed the 7 A minimum response level with more than 3 A, this would be considered a fault, and the device 14 would respond with the Group #1 protection setting.

A similar two-level protection scheme can be applied for single-phase transformers applied on a 13.2/23 kV system. Table 2 below shows the transformer sizes and their currents for the same protection group chose for the 7.2 kV example.

TABLE 2

Single-phase 13.2 kV Overhead transformers

| Transformer Rating kVA | Rated Current Amperes | Intentional Overload Current Amperes | Protection Group |
|---|---|---|---|
| 10 | 1 | 1.5 | #1 |
| 15 | 1 | 2.5 | Minimum |
| 25 | 2 | 4 | Response = 7A |
| 37.5 | 3 | 5.5 | |
| 50 | 4 | 7.5 | |
| 75 | 5.5 | 11.5 | #2 |
| 100 | 7.5 | 15 | Minimum |
| | | | Response = 21A |

There is a desire to use the same protective device at both system voltages to reduce the stocking complexity. However, there may be a desire to provide a closer response to the intentional overload current for the smaller transformers. To achieve a closer response, a device could be designated with a voltage rating in addition to the protection Group, and a new, two-level protection group defined with lower minimum response currents as shown in Table 3 below. The initialization and adaption from Group #1A protection setting to Group #2A protection setting would be the same as that explained for the 7.2 kV example, except that the minimum response current for Group #1A setting is 4 A rather than the Group #1 setting of 7 A would determine when the shift would occur.

TABLE 3

Single-phase 13.2 kV Overhead transformers

| Transformer Rating kVA | Rated Current Amperes | Intentional Overload Current Amperes | Protection Group |
|---|---|---|---|
| 10 | 1 | 1.5 | #1A |
| 15 | 1 | 2.5 | Minimum |
| 25 | 2 | 4 | Response = 4A |
| 37.5 | 3 | 5.5 | #2A |
| 50 | 4 | 7.5 | Minimum |
| 75 | 5.5 | 11.5 | Response = 15A |
| 100 | 7.5 | 15 | |

A three-level protection setting could offer a more desirable protection level for transformers at both voltage levels, as shown in Table 4 below.

TABLE 4

| 7.2 kV | | | 13.2 kV | |
|---|---|---|---|---|
| Transformer Size kVA | Transformer Intended Overload Current Amperes | 3-Level Protection Group | Transformer Size KVA | Transformer Intended Overload Current Amperes |
| 10 | 3 | Group #1B Minimum Response = 4A | 10 | 1.5 |
| 15 | 4 | | 15 | 2.5 |
| 25 | 7 | | 25 | 4 |
| | | Group #2B Minimum Response = 7.5A | 37.5 | 5.5 |
| | | | 50 | 7.5 |
| 37.5 | 10.5 | Group #3B Minimum Response = 21A | | |
| 50 | 14 | | 75 | 11.5 |
| 75 | 21 | | 100 | 15 |

The initial protection response would start with the smallest, Group #1B protection setting, and adjust to the next level Group #2B protection setting, and adjust even further to Group #3B protection setting based on the incremental load increases as described above for the two-level Group protection settings. This would provide faster fault detection for the smaller transformer that a two Group protection setting could provide.

Fuses typically respond at two times their continuous ampere rating, and when applied to carry a 2 PU transformer overload, they don't respond until 4 PU of the transformer normal load current. In addition, fuses are chosen with high lightning surge capabilities making them slow to respond. A single, larger size fuse link (10 A or more in rating) may be applied for multiple transformer sizes from 10 kVA up to 25 KVA to simplify stocking and field deployment. The protection offer by the Group #1 protection setting for 10 through 25 kVA transformers at 7.2 kV can offer a vastly improved protection even for the smallest transformer. It closely tracks the maximum cold load inrush characteristic for the 25 kVA transformer, but offers improved protection than the 3 A KSR link.

Figure 4:
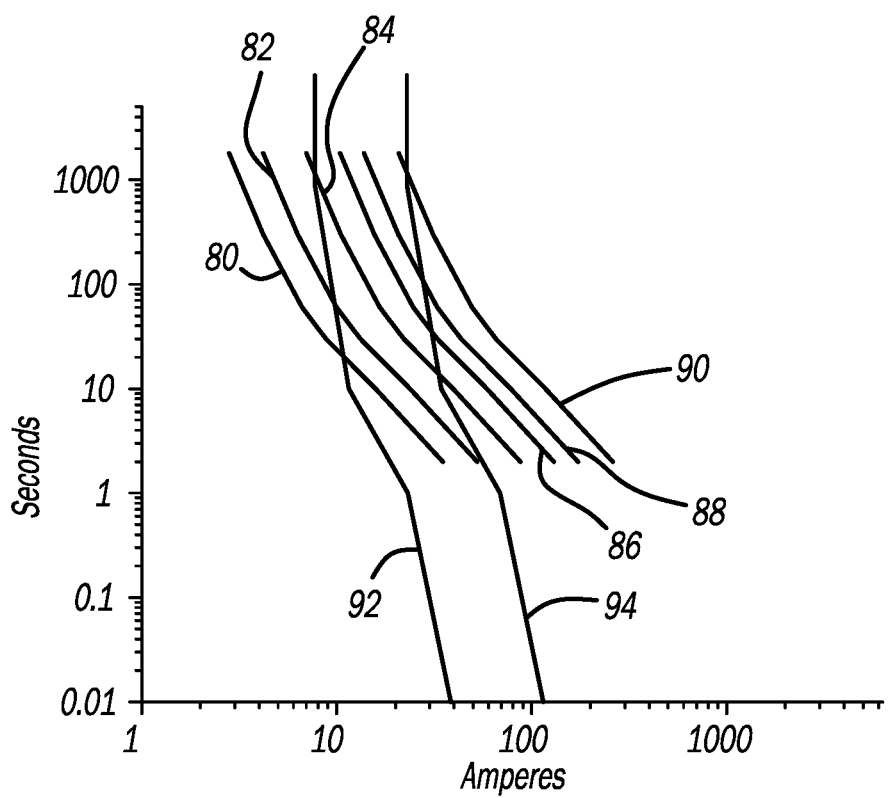
FIG. 4 is a logarithmic graph with current on the horizontal axis and time on the vertical axis showing a plurality of transformer through fault protection withstand curves for a plurality of different rated transformers and a pair of optimized fault protection curves for a fault interrupting device.

FIG. 4 is a logarithmic graph with current in amps on the horizontal axis and time in seconds on the vertical axis showing various TCC curves for the protection settings as discussed below. Particularly, TCC curve 80 is a transformer through fault protection withstand or damage curve for a 10 KVA rated transformer, TCC curve 82 is a transformer through fault protection withstand or damage curve for a 15 kVA rated transformer, TCC curve 84 is a transformer through fault protection withstand or damage curve for a 25 kVA rated transformer, TCC curve 86 is a transformer through fault protection withstand or damage curve for a 37.5 kVA rated transformer, TCC curve 88 is a transformer through fault protection withstand or damage curve for a 50 kVA rated transformer, and TCC curve 90 is a transformer through fault protection withstand or damage curve for a 75 kVA rated transformer. TCC curve 92 is a protection curve for the Group #1 protection setting that covers the 10 through 25 kVA transformers at 7.2 kV and TCC curve 94 is a protection curve for Group #2 protection setting that covers the 37.5 through 75 kVA transformers at 7.2 kV.

All of the transformers are well protected with the optimized protection response. The adaptive protection selects the higher protective characteristic for the larger transformer sizes. As noted above, a three-level protection grouping (Group #1B, #2B and #3B) can provide better protection with applications at both 7.2/12.47 kV systems and 13.2/23 kV systems.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method for determining when an electronic interrupting device will operate in response to detecting overcurrent, the electronic interrupting device protecting a transformer in a power distribution network, the method comprising:
    providing a time-current characteristic (TCC) transformer curve that identifies an allowed transformer operation current once the transformer magnetics have been stabilized and the transformer is operating normally; and
    determining a TCC operating curve that is defined by points along the transformer curve plus a predetermined percentage above the transformer curve, where the operating curve identifies a response time for when the electronic interrupting device will open in response to a certain current flow.

2. The method according to claim 1 wherein the predetermined percentage is between 0% and 50%.

3. The method according to claim 1 wherein the predetermined percentage is 10%.

4. The method according to claim 1 wherein the transformer has a rated full-load current that defines 1 per unit (PU), and wherein the TCC transformer curve is set at 2 PU.

5. The method according to claim 4 wherein for a current of 2.2 PU, the response time is 900 seconds, for a current of 3.3 PU, the response time is 10 seconds, for a current of 6.6 PU, the response time is 1 second, for a current of 10 PU, the response time is 0.01 seconds, and for currents above 10 PU, the response time is 0.008 seconds.

6. The method according to claim 1 wherein the TCC operating curve is above a cold load inrush current of the transformer.

7. The method according to claim 6 wherein the electronic interrupting device is prevented from opening based on a predetermined time delay.

8. The method according to claim 1 wherein the TCC operating curve is below a magnetizing inrush current of the transformer.

9. The method according to claim 8 wherein the electronic interrupting device is prevented from opening during the magnetizing inrush current.

10. The method according to claim 1 wherein the transformer is a distribution transformer that converts medium voltage to low voltage to be delivered to low voltage customer loads.

11. The method according to claim 1 wherein the interrupting device is a cut-out mounted interrupting device.

12. The method according to claim 1 wherein the interrupting device is a single phase self-powered magnetically actuated recloser.

13. The method according to claim 1 wherein the interrupting device includes a vacuum interrupter.

14. The method of claim 1, wherein determining a TCC operating curve comprises determining a TCC operating curve that is defined by points along the transformer curve plus 10% above the transformer curve, where the operating curve identifies a response time for when the electronic interrupting device will open in response to a certain current flow.

15. A method for determining when an electronic interrupting device will open in response to detecting overcurrent, the electronic interrupting device protecting an object transformer in a power distribution network, the method comprising:

identifying a plurality of group transformers each having a different power rating and current rating, the object transformer being one of the group transformers;

defining at least two groups of the group transformers where each group includes at least one transformer and where one group includes transformers having a sequence of lower power ratings and one group includes transformers having a sequence of higher power ratings;

providing a time/current operating curve for the electronic interrupting device that determines when the electronic interrupting device will open in response to a certain current flow over a certain time for each group, wherein the operating curve for each group is determined based on the transformer having the highest power rating in the group;

setting the interrupting device with the operating curve that is associated with the group transformer having the highest power rating in the group having the sequence of lower power ratings;

measuring the load current on the object transformer; and changing the operating curve for the interrupting device to the operating curve that is associated with the transformer having the highest power rating in the group having the sequence of higher power ratings if the measured load current is above a predetermined value.

16. The method according to claim 15 wherein the plurality of group transformers are at least six transformers having power ratings of 10 kVA, 15 kVA, 25 kVA, 37.5 kVA, 50 kVA and 75 kVA, and wherein the transformers having the 10 kVA, 15 kVA and 25 kVA power ratings are in the group having a sequence of lower power ratings and the transformers having the 37.5 kVA, 50 kVA and 75 kVA power ratings are in the group having a sequence of higher power ratings.

17. The method according to claim 15 wherein the transformer is a distribution transformer that converts medium voltage to low voltage to be delivered to low voltage customer loads.

18. The method according to claim 15 wherein the interrupting device is a cut-out mounted interrupting device.

19. The method according to claim 15 wherein the interrupting device is a single phase self-powered magnetically actuated recloser.

20. The method according to claim 15 wherein the interrupting device includes a vacuum interrupter.

* * * * *